3,223,025
MULTIPLE EGG BROILER
Russell B. Johns, 4349 Dorr St., Toledo, Ohio
Filed July 20, 1964, Ser. No. 383,737
1 Claim. (Cl. 99—377)

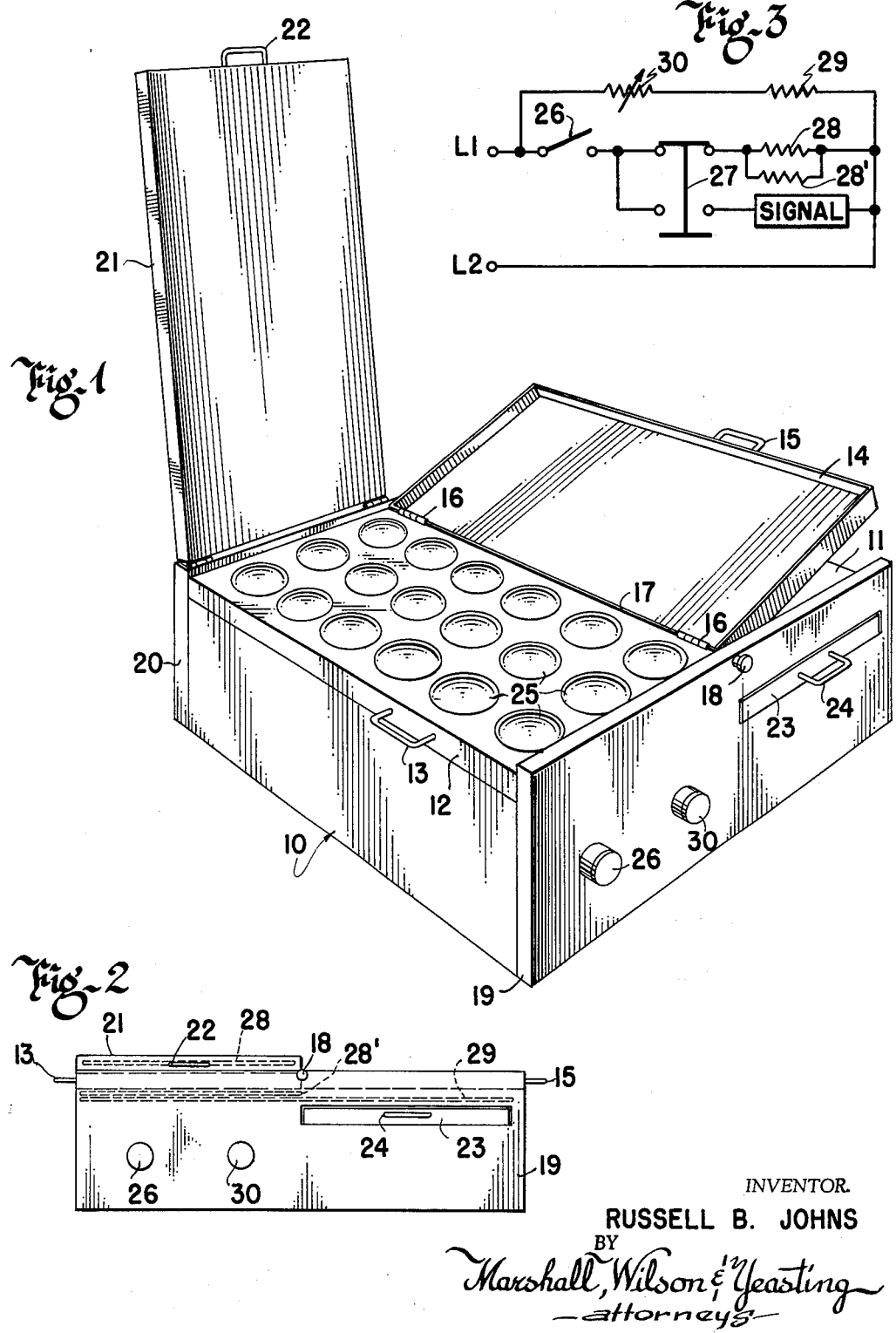

The present invention relates to a multiple egg cooker for broiling or frying a plurality of eggs simultaneously.

It is well known in the restaurant business that the frying or broiling of eggs is a relatively expensive operation because of the great amount of hand labor involved. During the frying of eggs the eggs must be watched very closely to avoid under cooking or over cooking, and the cooked eggs must be handled very carefully to preserve a good appearance and to avoid breaking the yolks.

Since the cooked eggs must be removed from the cooking plate carefully one at a time, it is difficult to control the duration of the cooking of several eggs simultaneously and it is impractical to cook more than a few eggs at one time.

The principal object of the invention is to provide a novel egg cooker in which a substantial number of eggs may be cooked simultaneously and then may be transferred simultaneously from the cooking pan to a serving pan, without separate handling of the eggs, while preserving a good appearance of the cooked eggs. More specific objects and advantages are apparent from the following description, in which reference is had to the accompanying drawings illustrating a preferred embodiment of the invention.

FIG. 1 of the drawings is a perspective view of a preferred form of multiple egg cooker embodying the invention.

FIG. 2 is a front view of the egg cooker.

FIG. 3 is a wiring diagram.

The multiple egg cooker shown in the drawings comprises a box-like frame 10, preferably made of stainless steel. The top surface 11 of the frame 10 is adapted to support a cooking pan 12 having a handle 13 and a serving pan 14 having a handle 15. The handles 13 and 15 preferably are made of a material that conducts heat slowly enough so that the handles do not become uncomfortably hot. The pans 12 and 14 may consist of aluminum stampings or castings.

The pans 12 and 14 are hinged together by means of hinges 16 provided on the adjacent edges of the pans. These hinges have a single elongated hinge pin 17 which is provided with a knob 18 at one end and which extends through the front panel 19 and the back panel 20 of the frame 10. The pans 12 and 14 are not attached to the frame 10 otherwise than by the hinge pin 17.

A heating panel 21 provided with a handle 22 is hinged to the back panel 20 of the frame 10 so that the heating panel may be moved from an inactive upright position shown in FIG. 1 to an active horizontal position shown in FIG. 2. When the heating panel 21 is in its active horizontal position, its front edge rests upon the upper edge of the front panel 19 of the frame 10 so that the heating panel is spaced a slight distance above the cooking pan 12.

A holding pan 23 of a shape similar to that of the serving pan 14 is provided with a handle 24 and is slidably mounted like a drawer in the frame 10.

The upper surface of the cooking pan 12 is provided with a number of depressions 25, each of which is intended to hold one egg during the cooking operation.

In operation, a raw egg is placed in each of the depressions 25 and the heating panel 21 is lowered to its horizontal position to begin the cooking operation. At the end of the cooking operation, the heating panel 21 is raised to its upright or inactive position, and the serving pan 14 then is pivoted on the hinges 16 to bring the serving pan on top of the cooking pan 12. The handles 13 and 15 are then closely adjacent, so that the operator can grasp both handles in one hand and swing both pans as a unit to their other extreme positions in which the serving pan 14 is on the bottom and the cooking pan 12 is on the top. This deposits the cooked eggs up side down on the serving pan 14, and the cooking pan 12 is then swung back to its original position.

Then the next cooking operation can be carried out by one operator while another operator is serving the individual cooked eggs from the serving pan 14 by means of a spatula. At the end of the next cooking operation, if any of the eggs from the previous cooking operation remain on the serving pan 14, these remaining eggs are transferred to the holding pan 23 so that the new batch of cooked eggs may be transferred from the cooking pan 12 to the serving pan 14 in the manner hereinbefore described.

The upper surfaces of the pans 12, 14 and 23 preferably are coated with one of the known materials such as Teflon which are commonly used to coat aluminum frying pans in order to prevent food from sticking thereto.

One advantage of the depressions 25 in the cooking pan 12 is that they hold the eggs in position while the cooking pan and the serving pan are being swung as a unit to bring the cooking pan on top of the serving pan. If a flat pan with no depressions is used as the cooking pan, or if the depressions 25 are very shallow, the pans should be designed so that when the serving pan 14 is brought on top of the cooking pan 12 the cooked eggs are pressed very lightly between the two pans so as to hold them in place while the two pans are being swung together through an angle of 180°.

Another advantage of the depressions 25 is that they give a relatively attractive symmetrical form to the cooked eggs. The novel construction which permits the two pans to be swung through an angle of 180° to deposit the cooked eggs upon the serving pan makes it possible to cook the eggs in depressions. Without this arrangement for transferring the eggs from the cooking pan to the serving pan, it would not be practical to cook the eggs in depressions because it would be too difficult to remove the eggs from such depressions by means of a spatula.

The simultaneous transfer of the cooked eggs from the cooking pan to the serving pan in the manner hereinbefore described insures that all the eggs will be cooked to the same degree. The cooking pan is quite hot at the end of the cooking operation, so that it would be impossible to cook all the eggs to the same degree if it were necessary to remove the eggs manually one at a time from the cooking pan.

The cooking pan 12 and the serving pan 14 may be removed for cleaning by simply withdrawing the hinge pin 17, and the holding pan 23 may be removed by simply pulling it all the way out.

The heating of the cooking pan 12 preferably is controlled in substantially the same manner as the heating of an electric toaster.

A rotary two-position switch 26 may be provided in the form of a knob located on the front panel 19 of the frame 10. The switch 26 has an "off" position and an "on" position. Preferably the two-position switch 26 is arranged so that movement of this switch to its "on" position resets a control switch 27. FIG. 3 shows the control switch 27 in its reset position, in which the upper contacts of this control switch complete a circuit from the line L1 through electrical heating elements 28 and 28' to the line L2.

A short time after the two-position switch 26 has been closed, a timer or thermostat (not shown) operates to move the control switch 27 to its operated position (which would be its raised position in FIG. 3). Preferably the control switch 27 is provided with an additional pair of contacts as shown in FIG. 3 which in the operated position of the control switch completes a circuit from the line L1 through an electrical signal to the line L2. The electrical signal preferably is a buzzer but may consist of a warning light.

In order to carry out a cooking operation, the two-position switch 26 is first moved to its "on" or closed position. Then after a short time, for example two minutes, the control switch 27 is automatically moved by the timer or thermostat to its operated position, thus cutting off the current from the electrical heating elements 28 and 28' and energizing the electrical signal. The operator then moves the two-position switch 26 to its "off" position in order to terminate the signal.

At the beginning of the next cooking operation, movement of the two-position switch 26 to its "on" position resets the control switch 27 to the position shown in FIG. 3.

For simplicity of illustration, the electrical heating element 28 is shown in FIG. 2 as located in the interior of the heating panel 21, but the heating element 28 preferably is arranged in an exposed position on the underside of the heating panel. An auxiliary electrical heating element 28' for clarity of illustration is shown below the upper surface of the frame in FIG. 2, but this auxiliary heating element preferably is located on top of the upper surface 11 of the frame 10.

The time during which the control switch 27 remains in its reset position after closure of the two-position switch 26 and the temperatures attained by the electrical heating elements should be such that the eggs are cooked to the proper degree.

Even when an auxiliary heating element 28' is provided, it is usually desirable to employ the heating element 28 and the heating panel 21 as the principal source of heat for cooking the eggs. When that is done, the eggs are cooked from above, or "broiled," so that when they are transferred to the serving pan 14 the more severely cooked side of the eggs is on the bottom.

A constant temperature heating element 29 is also provided to keep the cooker warm at all times so long as the cooker is connected to the power supply. The temperature of the heating element 29 may be adjusted by means of a rheostat 30 located on the front panel 19. The heating element 29 extends below the serving pan 14 and above the drawer 23 so as to keep the cooked eggs warm both in the serving pan and in the drawer. Preferably the constant temperature heating element 29 is located just below the top surface 11 of the frame 10 and extends throughout the area of the top surface 11 so that both the cooking pan 12 and the serving pan 14 are kept warm and ready for use. For example, the cooking pan and serving pan may be kept at a minimum temperature of approximately 125 degrees F. between cooking operations.

Various other modifications of the apparatus may be devised to meet various requirements.

Having described the invention, I claim:

A multiple egg cooker comprising, in combination, a pan for cooking a plurality of eggs simultaneously, a serving pan adjacent to the cooking pan, a frame for supporting the pans in a substantially horizontal position, and electrical heating panel which is pivotally mounted on the frame at one side of the cooking pan for movement between a substantially horizontal position above the cooking pan and a substantially vertical position, and a common pivotal mounting which is located between the pans and which secures both pans pivotally to the frame for movement through an arc of substantially 180°.

References Cited by the Examiner

UNITED STATES PATENTS

| | | | |
|---|---|---|---|
| 316,741 | 4/1885 | Carpenter | 99—424 |
| 1,678,690 | 7/1928 | Connell | 99—377 X |
| 1,739,062 | 12/1929 | Connolly | 99—440 X |
| 1,751,219 | 3/1930 | Seamon | 99—443 X |
| 1,954,235 | 4/1934 | Becker et al. | 99—339 |
| 2,059,133 | 10/1936 | Merritt | 99—339 |
| 2,314,872 | 3/1943 | Dickey | 99—340 |
| 2,824,510 | 2/1958 | Gangwer | 99—423 |
| 2,905,987 | 9/1959 | Hoekstra et al. | 214—300 X |

FOREIGN PATENTS 654,971    1/1938    Germany.

WALTER A. SCHEEL, *Primary Examiner.*

BILLY J. WILHITE, *Examiner.*